United States Patent
Kruglick (10) Patent No.: US 9,369,477 B2
(45) Date of Patent: Jun. 14, 2016

(54) MITIGATION OF PATH-BASED CONVERGENCE ATTACKS

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 12 days.

(21) Appl. No.: 14/290,883

(22) Filed: May 29, 2014

(65) Prior Publication Data

US 2015/0350227 A1    Dec. 3, 2015

(51) Int. Cl.
*H04L 29/06*      (2006.01)

(52) U.S. Cl.
CPC ........ *H04L 63/1416* (2013.01); *H04L 63/1466* (2013.01)

(58) Field of Classification Search
CPC .................................................. H04L 63/1416
USPC .......................................................... 726/23
See application file for complete search history.

(56) References Cited

U.S. PATENT DOCUMENTS

| | | | |
|---|---|---|---|
| 7,617,533 B1 * | 11/2009 | Hernacki | ............ H04L 63/1441 726/22 |
| 7,752,666 B2 | 7/2010 | Jayawardena et al. | |
| 8,125,895 B2 | 2/2012 | Yasuie et al. | |
| 8,230,504 B1 | 7/2012 | Jafari et al. | |
| 8,442,030 B2 | 5/2013 | Dennison | |
| 2003/0086422 A1 | 5/2003 | Klinker et al. | |
| 2004/0196843 A1 * | 10/2004 | Zinin | ...................... H04L 12/24 370/389 |
| 2006/0195436 A1 | 8/2006 | Levesque et al. | |
| 2008/0162679 A1 * | 7/2008 | Maher | ................. H04L 63/1458 709/223 |
| 2010/0061227 A1 | 3/2010 | Sundt et al. | |
| 2011/0058545 A1 | 3/2011 | Eriksson | |
| 2011/0116499 A1 | 5/2011 | Lim et al. | |
| 2013/0046887 A1 | 2/2013 | Malloy et al. | |

(Continued)

FOREIGN PATENT DOCUMENTS

WO      2004070509 A2      8/2004

OTHER PUBLICATIONS

"PCAP," Accessed at http://web.archive.org/web/20140421213631/http://www.tcpdump.org/pcap3_man.html, accessed on May 28, 2014, pp. 10.

(Continued)

*Primary Examiner* — Jacob Lipman
(74) *Attorney, Agent, or Firm* — Turk IP Law, LLC (57) ABSTRACT

Technologies are generally described for mitigation of a convergence attack in a network portion that includes multiple nodes interconnected by links in a closed configuration. In some examples, the attack may be detected by a detection module of an attack mitigation system in response to a determination that received average time to live (TTL) values of data packets are substantially decreased over the multiple nodes of the network portion. An identification module of the system may identify one or more potential attack links causing the attack, and generate a list from the potential attack links. The identification module may iterate the list across the potential attack links to gather traffic statistics of the network portion, and determine one or more attack links based on the traffic statistics. User-specific data traffic throttling to the attack links may then be enforced by a throttling module of the system to mitigate the attack.

15 Claims, 7 Drawing Sheets

(56) References Cited

U.S. PATENT DOCUMENTS

| | | | | |
|---|---|---|---|---|
| 2014/0007238 A1* | 1/2014 | Magee | ............... | G06F 21/577 726/24 |
| 2015/0135176 A1 | 5/2015 | Kruglick | | |

OTHER PUBLICATIONS

"Traceroute," Accessed at http://web.archive.org/web/20140226112811/https://en.wikipedia.org/wiki/Traceroute, accessed on May 28, 2014, pp. 12.

"What is Impacket?," Accessed at http://corelabs.coresecurity.com/index.php?module=Wiki&action=view&type=tool &name=Impacket, accessed on May 28, 2014, pp. 5.

Andreasson, O., "Iptables Tutorial 1.2.2," Accessed at http://web.archive.org/web/20140125085654/https://www.frozentux.net/iptables-tutorial/iptables-tutorial.html, accessed on May 28, 2014, pp. 261.

Benson, T. et al., "Network Traffic Characteristics of Data Centers in the Wild," In Proceedings of the 10th Annual Conference on Internet Measurement, pp. 267-280 (2010).

Covarrubias-Rodriguez, J.C. et al., "FLF4DoS. Dynamic DDoS Mitigation based on TTL field using fuzzy logic," 17th International Conference on Electronics, Communications and Computers, pp. 21 (2007).

Emanuele, J. and Olivier.LE, M., "OSPF Security Vulnerabilities Analysis," RPSEC Working Group, Nov. 2003, pp. 20.

Evans, J., "Day 20: Traceroute in 15 lines of code using Scapy," Accessed at http://web.archive.org/web/20140427025015/http://jvns.ca/blog/2013/10/31/day-20-scapy-and-traceroute/, Oct. 31,2013, pp. 3.

Francois, P. and Bonaventure, O., "Avoiding Transient Loops During IGP Convergence in IP Networks," In INFOCOM 2005, 24th Annual Joint Conference of the IEEE Computer and Communications Societies, Proceedings IEEE, 1, pp. 237-247 (2005 ).

Francois, P. et al., "Disruption Free Topology Reconfiguration in OSPF Networks," In INFOCOM 2007. 26th IEEE International Conference on Computer Communications, IEEE, pp. 89-97, (2007).

Gill, V. et al., "The Generalized TTL Security Mechanism (GTSM)," Network Working Group, RFC3682, pp. 16 (2007).

Greenberg, A., et al., "VL2: a Scalable and Flexible Data Center Network," Communications of the ACM, vol. 54, No. 3, pp. 95-104 (2011).

Hengartner, U. et al., "Detection and Analysis of Routing Loops in Packet Traces," In Proceedings of the 2nd ACM SIGCOMM Workshop on Internet Measurment, pp. 107-112 (2002).

McKeown, N. et al., "OpenFlow: Enabling Innovation in Campus Networks," ACM SIGCOMM Computer Communication Review, vol. 38, No. 2, pp. 69-74 (2008).

Steenbergen, R.A., "Traceroute," pp. 1-20 (2011).

Tootoonchian, A., and Ganjali, Y., "HyperFlow: A Distributed Control Plane for OpenFlow," In Proceedings of the 2010 Internet Network Management Conference on Research on Enterprise Networking, pp. 6 (2010).

Villamizar, C., "Ospf Optimized Multipath (ospf-omp)," Internet Engineering Task Force, pp. 1-34 (1999).

Wang, H. et al., "Defense Against Spoofed IP Traffic Using Hop-Count Filtering," IEEE/ACM Transactions on Networking, vol. 15, No. 1, Feb. 2007, pp. 40-53.

"OpenFlow MythBusting by Google," accessed at http://www.bigswitch.com/blog/2012/04/30/openflow-mythbusting-by-google, accessed on Jan. 23, 2014, pp. 1-4.

"Software Defined Networking," accessed at http://web.archive.org/web/20130429174226/http://wnl.ku.edu.tr/sdn.html, accessed on Jan. 23, 2014, pp. 1-1.

"Startup Tackles OpenFlow Security," accessed at http://web.archive.org/web/20120920143116/http://www.lightreading.com/document.asp?doc_id=219752, Apr. 12, 2012, pp. 1-6.

"www.OpenFlowSec.org," accessed at http://web.archive.org/web/20120616024659/http://www.openflowsec.org/, accessed on Jan. 23, 2014, pp. 1-2.

Babcock, C., "With Rackspace Cloud, OpenStack Goes Primetime," accessed at http://web.archive.org/web/20130324003144/http://www.informationweek.com/cloud-computing/infrastructure/with-rackspace-cloud-openstack-goes-prim/232900379, Apr. 17, 2012, pp. 1-6.

Besag, J., "Spatial Interaction and the Statistical Analysis of Lattice Systems," Journal of the Royal Statistical Society. Series B (Methodological), vol. 36, No. 2, pp. 192-236 (1974).

Bort, J., "Oracle Just Declared War on Cisco ," accessed at http://web.archive.org/web/20120902014929/http://www.businessinsider.com/oracle-cisco-software-defined-networking-2012-7, Jul. 30, 2012, pp. 1-3.

Bu, T. et al., "Network Tomography on General Topologies," Proceedings of the 2002 ACM SIGMETRICS international conference on Measurement and modeling of computer systems, pp. 21-30 (2002).

Cáceres, R., et al., "Multicast-Based Inference of Network-Internal Loss Characteristics," IEEE Transaction on Information Theory, vol. 45, Issue 7, pp. 2462-2480 (1999).

Cao, J., et al., "A Scalable Method for Estimating Network Traffic Matrices from Link Counts," Technical Report, Bell Labs, pp. 1-9 (2000).

Cao, J., et al., "Time-varying network tomography: Router link data," Journal of the American Statistical Association, vol. 95, No. 452, pp. 1063-1075 (2000).

Castro, R., et al., "Network Tomography: Recent Developments," Statistical Science, vol. 19, No. 3, pp. 499-517, Institute of Mathematical Statistics (2004).

Denneman, F., "Storage DRS, more than I/O load-balancing only," accessed at http://web.archive.org/web/20120502080528/http://blogs.vmware.com/vsphere/2012/04/storage-drs-more-than-io-load-balancing-only.html, accessed on Jan. 24, 2014, pp. 1-2.

Ghita, D., et al., "Shifting Network Tomography Toward a Practical Goal," Proceedings of the Seventh COnference on emerging Networking EXperiments and Technologies, pp. 12, ACM (2011).

Jackson, J., "VMware to Acquire Openflow Pioneer Nicira for $1.26 Billion," accessed at http://www.cio.com/article/711787/VMware_to_Acquire_Openflow_Pioneer_Nicira_for_1.26_Billion, Jul. 23, 2012, pp. 1-4.

Kerner, S.M., "OpenFlow Can Provide Security, Too," accessed at http://web.archive.org/web/20121113112129/http://www.enterprisenetworkingplanet.com/datacenter/openflow-can-provide-security-too.html, May 14, 2012, pp. 1-2.

Kerner, S.M., "VMware Takes Aim at Software Defined Networking and OpenFlow," accessed at http://web.archive.org/web/20130605013513/http://www.internetnews.com/infra/vmware-takes-aim-at-software-defined-networking-and-openflow.html, May 14, 2012, pp. 1-1.

Levy, S., "Going With the Flow: Google's Secret Switch to the Next Wave of Networking," accessed at http://web.archive.org/web/20130604044336/http://www.wired.com/wiredenterprise/2012/04/going-with-the-flow-google/, Apr. 17, 2012, pp. 1-3.

Razavi, "Verizon to Demonstrate Software Defined Networking Principles With Collaborative Lab Trials," accessed at http://web.archive.org/web/20130127025834/http://bizcloudnetwork.com/verizon-openflow, Apr. 17, 2012, pp. 1-3.

Song, D., et al., "Timing Analysis of Keystrokes and Timing Attacks on SSH," Proceedings of the 10th Conference on USENIX Security Symposium, vol. 10, pp. 16 (2001).

Vardi, Y., "Network Tomography: Estimating Source-Destination Traffic Intensities from Link Data," Journal ofthe American Statistical Association, vol. 91, Issue 433, pp. 365-377 (1996).

Zhang, Z., "Improving the Accuracy of Boolean Tomography by Exploiting Path Congestion Degrees," IEEE Symposium on Computers and Communications (ISCC), pp. 725-731 (2012).

Zhang-Shen, R., "Valiant Load-Balancing in Backbone Networks," pp. 4, Feb. 6, 2006.

(56) References Cited

OTHER PUBLICATIONS

Zhang-Shen, R., and McKeown, N., "Designing a Predictable Internet Backbone with Valiant Load-Balancing," In Quality of Service—IWQoS, Hermann Meer and Nina Bhatti, eds., vol. 3552, pp. 178-192 (2005).

International Search Report with Written Opinion for International Application No. PCT/US2013/044614 filed on Jun. 6, 2013 and mailed on Dec. 20, 2013.

Jaggi, S., "Zitan practice presentation on Network tomography," accessed at http://wn.com/network_tomography, Jul. 3, 2013, p. 1.

* cited by examiner

COMPUTER PROGRAM PRODUCT 700

SIGNAL BEARING MEDIUM 702

704 ONE OR MORE INSTRUCTIONS TO
    DETECT A PATH-BASED CONVERGENCE ATTACK IN A PORTION OF A NETWORK ;
    IDENTIFY ONE OR MORE POTENTIAL ATTACK LINKS CAUSING THE ATTACK IN ORDER TO GENERATE A LIST FROM THE IDENTIFIED POTENTIAL ATTACK LINKS;
    ITERATE THE LIST ACROSS THE ONE OR MORE POTENTIAL ATTACK LINKS TO GATHER TRAFFIC STATISTICS OF THE NETWORK PORTION;
    DETERMINE ONE OR MORE ATTACK LINKS BASED ON THE GATHERED TRAFFIC STATISTICS OF THE NETWORK PORTION; AND
    ENFORCE DATA TRAFFIC THROTTLING TO THE ONE OR MORE ATTACK LINKS TO MITIGATE THE ATTACK.

| COMPUTER-READABLE MEDIUM 706 | RECORDABLE MEDIUM 708 | COMMUNICATIONS MEDIUM 710 |

FIG. 7

MITIGATION OF PATH-BASED CONVERGENCE ATTACKS

BACKGROUND

Unless otherwise indicated herein, the materials described in this section are not prior art to the claims in this application and are not admitted to be prior art by inclusion in this section.

Software defined networking (SDN) for datacenters may provide a user with an individualized virtual network that allows the user to configure and control the network. Additionally, multiple users may be provided virtualized networks that are realized in one overlapping physical network. Open Shortest Path First (OSPF) is a link-state routing protocol and may be one of the widely used interior gateway protocols (IGPs) in large networks. OSPF operates by employing a cost weighting on each link and directing traffic to the path with the lowest sum of the weighting. OSPF and other similar operating protocols may often be affected by transient loops, which occur when the path is changed on faster time scales than OSPF convergence times. The transient loops may be an indication of a convergence attack, which may be intentional or accidental. Current techniques executed by management systems to mitigate attacks may limit an amount of traffic available to be consumed by each user within the SDN system, which may cause most bandwidth to go unused and still leaves a possibility of networks to be compromised.

Accordingly, current attempts to detect, identify, and mitigate convergence attacks in SDN systems could use improvements and/or alternative or additional solutions, such that SDN infrastructure may be preserved while limiting an amount of data to be collected and/or transmitted to prevent reduction of bandwidth and enable the use of statistical provisioning for full utilization of the SDN system.

SUMMARY

The present disclosure generally describes techniques to detect and identify one or more attack links of a path-based convergence attack in order to mitigate the attack.

According to some examples, methods to mitigate a convergence attack in a network are provided, where the methods are executed at least in part on a computing device. An example method may include detecting a path-based convergence attack in a portion of the network, where the network portion includes multiple nodes interconnected by links in a closed configuration, and identifying one or more potential attack links causing the attack in the network portion to generate a list from the identified potential attack links. The example method may also include iterating the list across the potential attack links to gather traffic statistics of the network portion, determining one or more attack links based on the gathered traffic statistics of the network portion, and enforcing data traffic throttling to the attack links to mitigate the attack.

According to other examples, network controllers to mitigate a convergence attack in a network are described. An example network controller may include a communication module configured to communicate with multiple nodes of the network, wherein the multiple nodes are interconnected by links in a closed configuration within a portion of the network, a memory configured to store instructions, and a processor coupled to the memory. The processor may be operable to execute an attack mitigation application in conjunction with the instructions stored in the memory. The attack mitigation application may be configured to detect a path-based convergence attack in the network portion, identify one or more potential attack links causing the attack in the network portion to generate a list from the identified potential attack links, and iterate the list across the potential attack links to gather traffic statistics of the network portion. The attack mitigation application may be also configured to determine one or more attack links based on the gathered traffic statistics of the network portion, and enforce data traffic throttling to the attack links to mitigate the attack.

According to further examples, systems to mitigate a convergence attack in a network are described. An example system may include a detection module, an identification module, a throttling module, and a network controller. The detection module may be configured to detect a path-based convergence attack in a portion of the network by receiving average time to live (TTL) values of one or more data packets from multiple nodes of the network portion, wherein the multiple nodes are interconnected by links in a closed configuration within the network portion, and detecting the attack in response to a determination that the average TTL values of the data packets are substantially decreased over the multiple nodes. The identification module may be configured to identify one or more potential attack links causing the attack in the network portion to generate a list from the identified potential attack links, iterate the list across the potential attack links to gather traffic statistics of the network portion, and determine one or more attack links based on the gathered traffic statistics of the network portion. The throttling module may be configured to enforce data traffic throttling to the one or more attack links to mitigate the attack, where the data traffic throttling may be on-flow rate throttling configured to limit user-specific increases in traffic flow provided to the one or more attack links. The network controller may be coupled to and configured to coordinate operations of the detection module, the identification module, and the throttling module.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to detection and identification of one or more attack links of a path-based convergence attack in order to mitigate the attack.

Briefly stated, technologies are generally described for mitigation of a convergence attack in a portion of a network that includes multiple nodes interconnected by links in a closed configuration. In some examples, the attack may be detected by a detection module of an attack mitigation system in response to a determination that received average time to live (TTL) values of one or more data packets are substantially decreased over the multiple nodes of the network portion. An identification module of the system may identify one or more potential attack links causing the attack, and generate a list from the potential attack links. The identification module may iterate the list across the potential attack links to gather traffic statistics of the network portion, and determine one or more attack links based on the traffic statistics. User-specific data traffic throttling to the attack links may then be enforced by a throttling module of the system to mitigate the attack.

Figure 1:
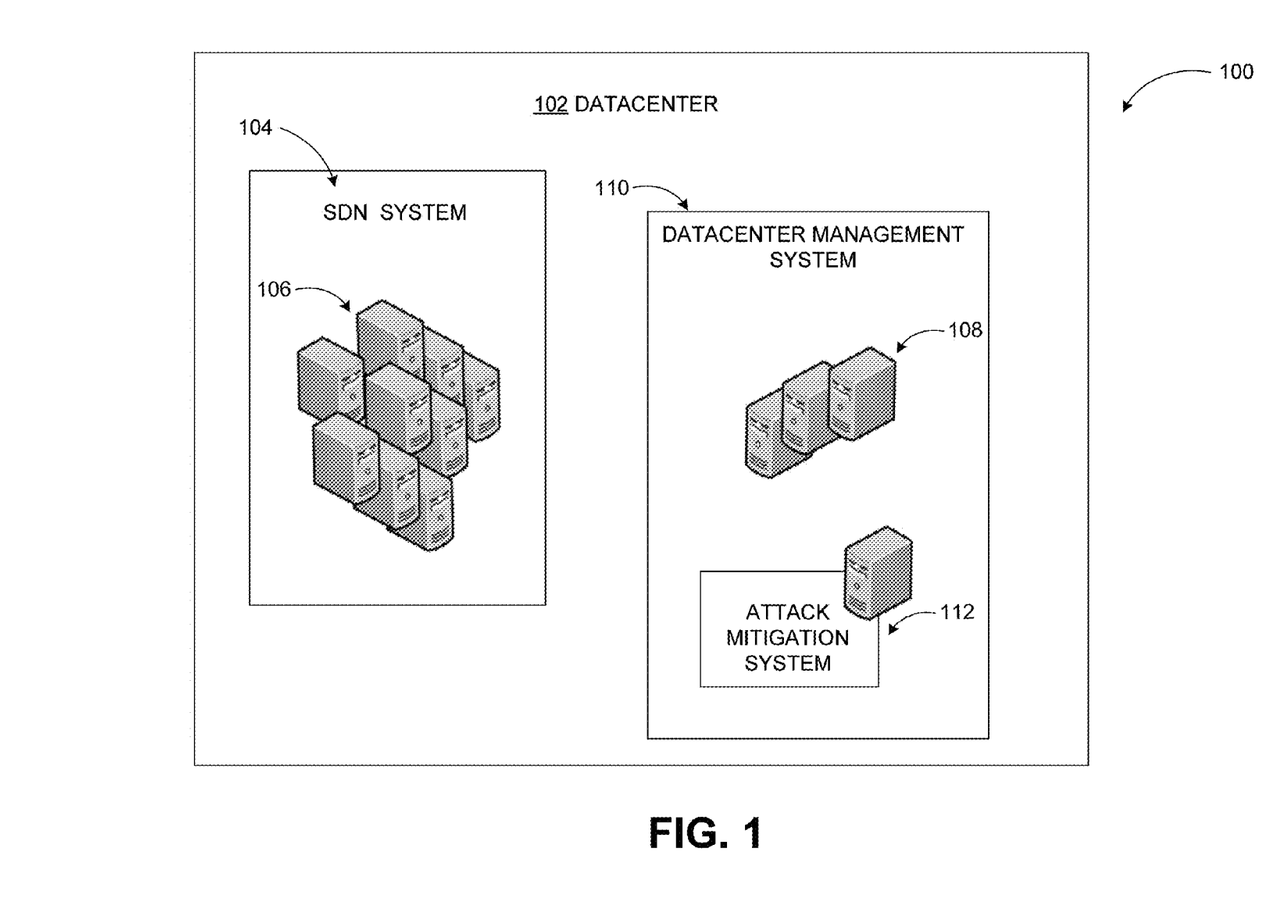
FIG. 1 illustrates an example network environment where a convergence attack may be detected and one or more attack links may be identified to mitigate the attack.

FIG. 1 illustrates an example network environment where a convergence attack may be detected and one or more attack links may be identified to mitigate the attack, arranged in accordance with at least some embodiments described herein.

As shown in a diagram 100, a datacenter 102 may include an SDN system 104 comprising one or more servers 106, and a datacenter management system 110 configured to manage the one or more servers 106 of the SDN system 104. The datacenter management system 110 may include one or more data management servers 108, of which, at least one may be operable to execute an attack mitigation system 112. The attack mitigation system 112 may be configured to detect a convergence attack, and identify one or more attack links in order to mitigate the attack. In some examples, the convergence attack may be an OSPF attack.

An SDN system, such as the SDN system 104, as described herein, may be a computer networking system that allows network administrators (or users) to manage network services through abstraction of lower level functionality. A control plane of the SDN system 104 configured to determine where data traffic is sent may be decoupled from a data plane comprising underlying systems configured to forward the data traffic to a selected destination. For example, a configuration of the SDN system 104 may create a logical network control plane, where hardware may be physically decoupled from the data forwarding plane hardware (that is, a network node may forward one data packets and a separate server may run the network control plane). The decoupling may allow for the control plane to be implemented using a different distribution model than the data plane. Control plane development and runtime environment tasks may then be run on a different platform yielding networking simplicity.

The SDN system 104 may provide users with an individualized virtual network that the users may configure and control. Furthermore, multiple users may be provided virtualized networks that are realized in one overlapping physical network. OSPF is a link-state routing protocol used within the SDN system 104 that operates by using a congestion or other cost weighting on each link of the network portion to direct traffic to a path with a lowest sum of the congestion or other weighting. Systems using OSPF, such as the SDN system 104, may be susceptible to a convergence attack if the traffic to the paths of the network portion is redirected repeatedly. Convergence is a state of a set of servers, such as the servers 106, which has a same topological information about the network in which the servers operate, such as the SDN system 104. To converge, the servers may collect available topology information from each other via an implemented routing protocol, such as OSPF or control plane operations, and the information gathered may not contradict any other server's topology information in the set, and may reflect a real state of the network. Convergence times are a time period needed for the servers to achieve convergence. The presence of one or more transient loops may be an indicator of convergence attack, which may be intentional or accidental. In some cases, transient loops may just be a feature of a strange emergent flow phenomenon. The loops may be termed transient because the loops oscillate, the loops resolving once the servers 106 of the SDN system 104 have updated topological information about the network in which the servers operate from a previous state to a next state. While conventional techniques to avoid convergence attacks exist for networks managed by a single party, the techniques add management complexity and fail to incorporate attack avoidance for newer architectural features such as multipath that may introduce new layers concerns.

In an example scenario, an attacking user may invoke a convergence attack within a network portion of the SDN system 104 by alternately congesting specific links interconnecting different nodes, or switches, of the network portion. The specific links may be congested by issuing commands that direct data traffic preferentially toward the nodes which the specific links interconnect, which may be easy for SDN-enabled users to perform. For example, the attacking user may simply send the data traffic labeled with those nodes to adjust and implement the attack with no further SDN configuration changes needed.

In some embodiments, the attack mitigation system 112 may be configured to detect a path-based convergence attack within a network portion of the SDN system 104, such as the attack described in the scenario above. The attack mitigation system 112 may be configured to detect the attack based on average time to live (TTL) values received from multiple nodes of the network portion, for example. The attack mitigation system 112 may identify one or more potential attack links that are causing the attack in the network portion based on a topology of the network portion and the detected attack in order to generate a list of potential attack links from the identified potential attack links. For example, the list may include links from the identified potential attack links that are in the closed configuration interconnecting identified victim nodes, and links that have alternating congestion signals. The list may be iterated across the identified potential attack links to gather network statistics, which may be used to determine one or more attack links. Once the attack links are determined, the attack mitigation system 112 may further be configured to enforce data throttling in order to mitigate the attack by limiting user-specific increases in traffic flow to the attack link to dampen oscillations of the attack. In other embodiments, the attack mitigation system 112 may be configured to enforce data throttling in order to mitigate the attack by directing traffic flow to non-affected links of the network portion.

The embodiments as described above detect the convergence attack and identify the attack links in order to mitigate the attack using existing SDN infrastructure, and do not limit bandwidth or data traffic flow on the attack links. For example, data throttling may limit the bandwidth of a user to no more than double every second, which may be sufficient to allow rerouting in the SDN system 104 while also having insignificant performance impacts. Additionally, by enforcing the data traffic throttling for a specific user (for example, the attacking user), statistical provisioning may still be practical to achieve increased utilization levels of the SDN system 104.

Figure 2:
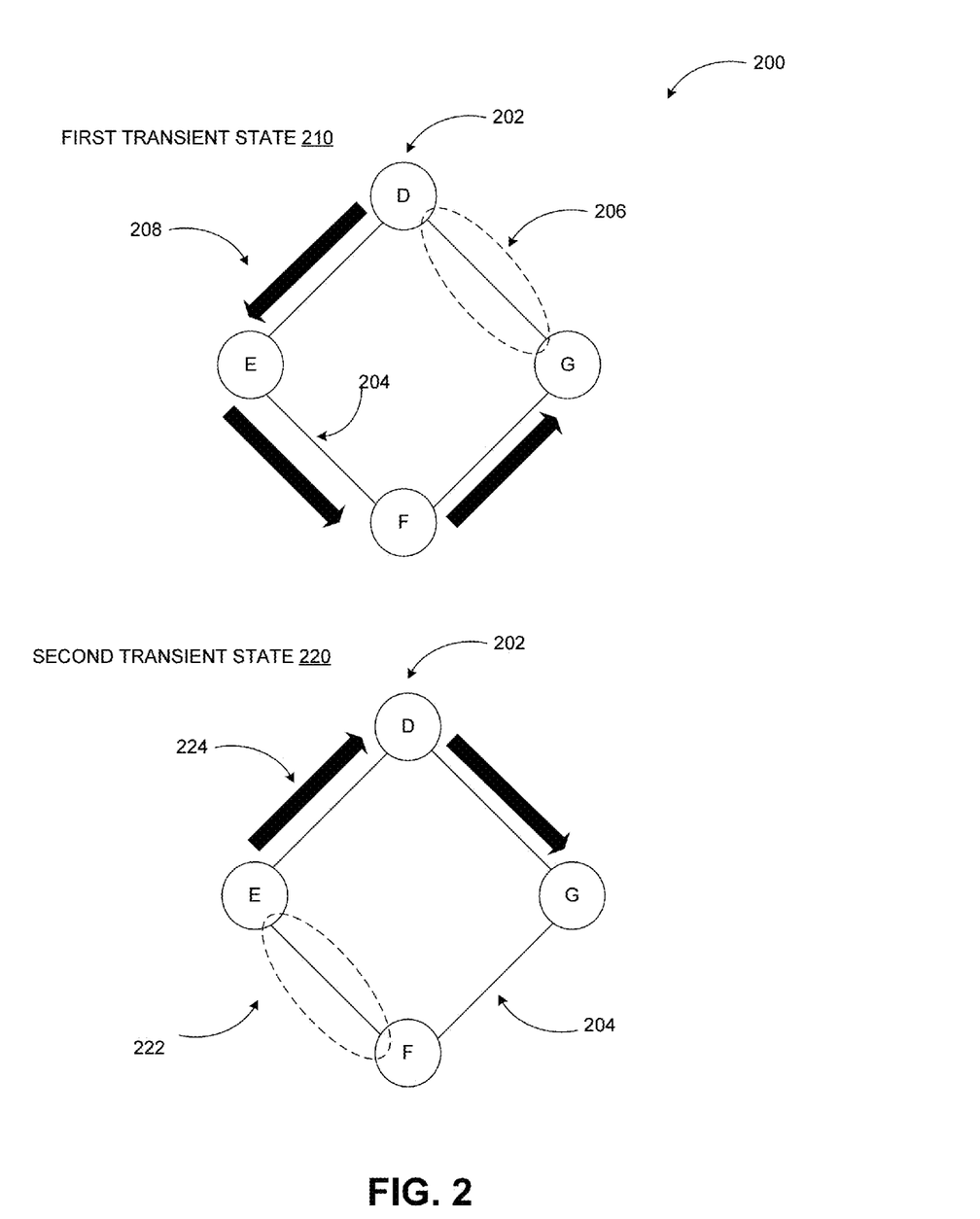
FIG. 2 illustrates example transient states of a convergence attack.

FIG. 2 illustrates example transient states of a convergence attack, arranged in accordance with at least some embodiments described herein.

As shown in a diagram 200, a network portion may include multiple nodes 202, or switches, such as nodes D, E, F, and G, interconnected by links 204 in a closed configuration with multiple paths. In some examples, the network portion may be within an SDN system. A convergence attack in the network portion, which may be an OSPF convergence attack, may have a first transient state 210 and a second transient state 220. Links interconnecting the nodes D and G and/or the nodes E and F may be alternately congested causing a transient loop to form, indicative of the convergence attack, between nodes D and E. The transient loop may be used to capture data traffic initially intended to reach G, as the system works to avoid the congested links interconnecting the nodes D and G and/or the nodes E and F. In some examples, the convergence attack may only be visible to a user as data traffic that disappears for a period of time, in a range from about 125 ms to about 500 ms, and often in an SDN system, the user may not be controlling where the traffic goes causing prevention of the attack to be difficult, if or assuming the attack is noticed.

In the first transient state 210, a link interconnecting the nodes D and G may be congested 206 such that data traffic intended for node G is routed from the nodes D to E to F to G, as illustrated by arrows 208, to reach the node G as initially intended. In the second transient state 220, a link interconnecting the nodes E and F may be congested 222 such that the data traffic intended for node G is re-routed from the nodes E to D to G, as illustrated by arrows 224, to reach the node G as initially intended. The first transient state 210 and the second transient state 220 may repeatedly be alternated causing a build-up of captured data traffic between nodes D and E in the transient loop. The links that are alternately congested may be identified as attack links, such as the links interconnecting the nodes D and G and/or the nodes E and F. The links that are involved in the transient loop may be identified as victim links, such as the link interconnecting nodes D and E, and the nodes that are interconnected by the victim links may be identified as victim nodes, such as nodes D and E.

In addition to causing a build-up of congestion, the convergence attack may cause one or more data packets within the data traffic to be lost. For example, the data packets captured in the transient loop may exceed their TTL value, a value indicating a number of forwards allowed for a delivery of each packet while within a loop. The value may be decremented at each forwarding from a node, and when the value reaches zero the packet may be discarded and an error message may be sent, which then joins the captured data traffic within the transient loop. Accordingly, the loop may cause many data packets to become lost and generate a large number of nonsensical error messages. The error messages may be lost too, if the transient loop lasts enough forwards for the error messages themselves to exceed their TTL value, causing the data traffic to silently disappear.

Figure 3:
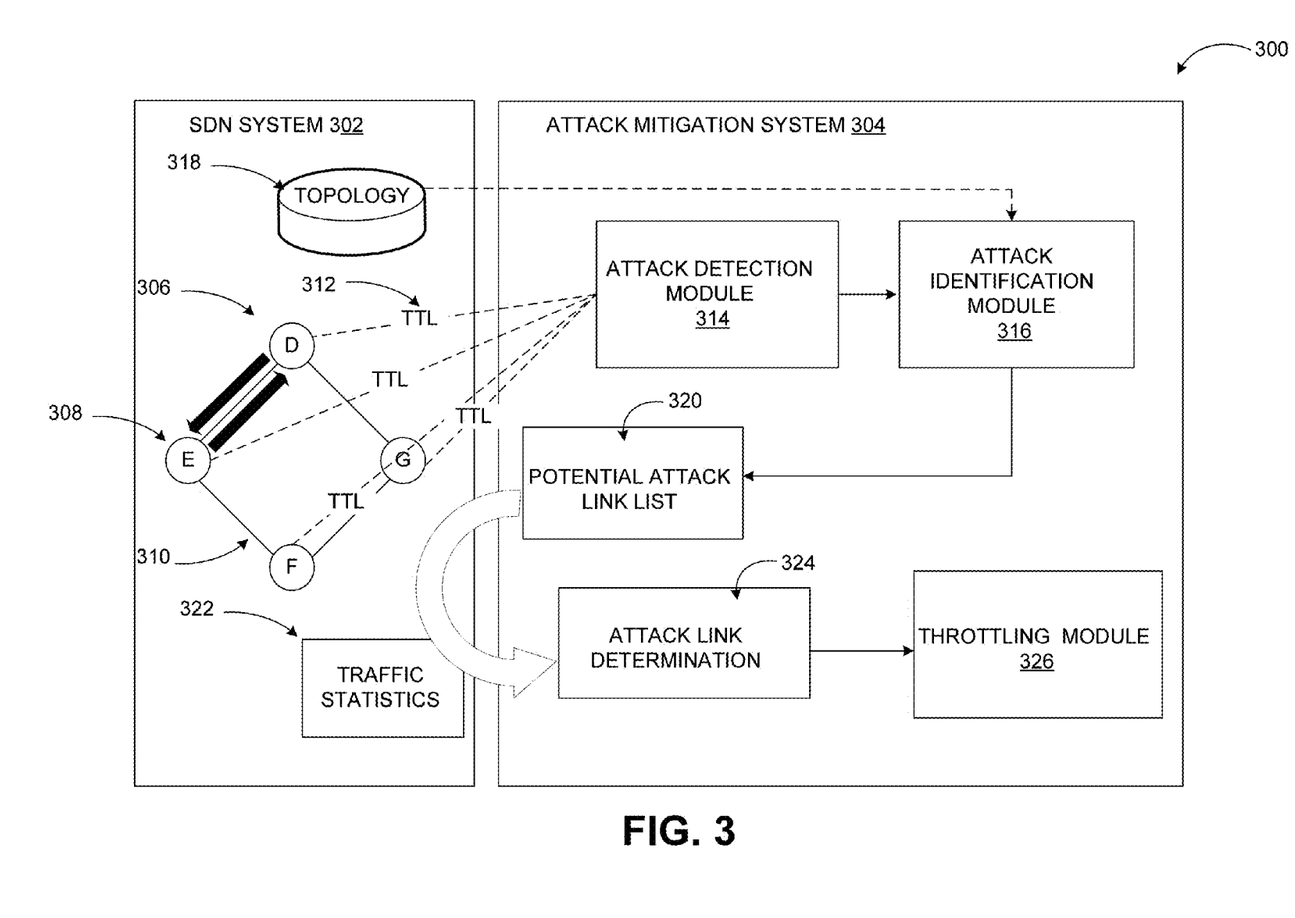
FIG. 3 illustrates an example system to mitigate a convergence attack in a network.

FIG. 3 illustrates an example system to mitigate a convergence attack in a network, arranged in accordance with at least some embodiments described herein.

As shown in a diagram 300, a network, such as an SDN system 302, may include at least one network portion 306 that includes multiple nodes 308, or switches, such as D, E, F, and G, that are interconnected by links 310 in a closed configuration with multiple paths. The network portion may include multiple nodes interconnected by links in a closed configuration, and each link of the network portion may comprise a network segment. An attack mitigation system 304 may be configured to mitigate a convergence attack in the network portion 306 of the SDN system 302, for example. The attack mitigation system 304 may include an attack detection module 314, an attack identification module 316, and a throttling module 326. In some embodiments, the attack mitigation system 304 may be part of a datacenter management system.

As described previously in conjunction with FIG. 2, the links 310 interconnecting the nodes D and G and/or the nodes E and F in the network portion 306 may be alternately congested by an attacking user in order to cause a build-up of captured data traffic in a transient loop, indicative of a convergence attack, between the nodes D and E. The transient loop created may capture data traffic initially intended to reach G, as the system works to avoid the congested links interconnecting the nodes D and G and/or the nodes E and F.

The attack detection module 314 of the attack mitigation system 304 may be configured to detect the convergence attack. In order to detect such an attack, the attack detection module 314 may issue or benefit from a command to the network portion 306 that instructs the multiple nodes 308 of the network portion 306 to track TTL values 312 of one or more data packets at each of the nodes 308. The attack detection module 314 may be configured to fetch or receive the average TTL values 312 of some or all of the data packets from the multiple nodes 308 of the network portion 306 according to a pre-defined schedule or upon a request.

A TTL value may be an upper bound on a duration of time or number of network hops that a data packet may exist in a network, such as the SDN system 302. The TTL value may be set by a sender of the data packet, and reduced by each node on the route to a destination of the data packet. An example TTL value range set by the sender may be from 64 to 255, for example. If the TTL value reaches zero before the data packet arrives at the destination, then the data packet may be discarded and an error message may be sent to the sender. A purpose of the TTL value may be to avoid a situation in which an undeliverable data packet keeps circulating within a system, and such a system eventually becomes overwhelmed by the undeliverable data packets. Accordingly, the TTL value may be inferred to be impacted by a network loop, such as a transient loop.

The nodes 308 of the network portion 306 may be configured to maintain running counts or averages. For example, the nodes 308 may keep histogram counts of Internet Protocol (IP) addresses of the data packets. A same data structure may be used to track the average TTL values 312 of the data packets without any changes or improvements to hardware of the nodes 308. For example, the nodes 308 may keep a running average of the TTL values 312, while subtracting out the oldest values as the oldest values are pushed out of a first in, first out (FIFO) buffer array. A population of the data packets captured in the transient loop of the attack may display consistently decreasing average TTL values. These average TTL values may be substantially lower than those of data packets being delivered to their destination. For example, each forward from a node implicated in the attack will reduce the average TTL value by one. Consequently, the attack may be detected in response to a determination that the average TTL values 312 of the data packets are substantially decreased over the multiple nodes 308.

In some embodiments, a decrease in the average TTL values 312 of the data packets as low as 10 or 20 may indicate an attack, with larger decreases indicating increasing likelihoods of an attack. However, changes to the IP paths of the population of data packets passing through the nodes 308 may also decrease the average TTL values as the data packets traveling longer distances change in relative population density, for example. Accordingly, decrease in the average TTL values may be evaluated in light of other statistics, such as histograms of IP addresses and changes to the IP addresses transiting a node, that may increase a threshold of average TTL value decrease needed to indicate an attack.

The attack identification module 316 may be configured to identify one or more potential attack links based on a topology 318 of the network portion 306 and the TTL value based attack detection. The topology 318 may supply graph linkages used to analyze which links of the network portion 306 are the attack links based on the detected attack. For example, one or more nodes at which the average TTL values 312 are substantially decreased may be identified as victim nodes. The average TTL values 312 may be substantially decreased at the victim nodes due to the high amount of data traffic re-routed and captured within the link interconnecting these nodes in an effort to avoid congestion built up by the attacking user. For example, nodes D and E may be identified as the victim nodes as packets at nodes D and E may have substantially decreased average TTL values 312. A high amount of data traffic may be re-routed and captured within the link interconnecting D and E to avoid the congested links interconnecting the nodes D and G and/or the nodes E and F causing some number of data packets to be repeatedly forwarded back and forth from D to E. Each time the data packets are forwarded from either D or E, the TTL values of the data packets may decrease. The identified potential attack links may include links that are in the closed configuration interconnecting the identified victim nodes, and links that have alternating congestion signals, for example.

A list 320 may be generated from the identified potential attack links such that the list includes potential attack links that are in the closed configuration of the network portion interconnecting the identified victim nodes and that have alternating congestion signals. The list 320 may be iterated across the potential attack links to gather traffic statistics 322 of the network portion 306. One or more attack links may then be determined 324 based on the traffic statistics 322.

Once the attack links are determined 324, the throttling module 326 may be configured to enforce data traffic throttling to the attack links to mitigate the attack. In one embodiment, traffic flow may be directed to non-affected links of the network portion to mitigate the attack. In another embodiment, the data throttling may be on-flow throttling, for example, which may limit user-specific traffic flow increases (for example, increases made by the attacking user) to the attack links to mitigate the attack. For example, if the transient loop is caused by alternating traffic congestion between two attack links, the on-flow rate throttle may cause the attack links to appear congested to the attacking user, and consequently force redistribution of the alternating traffic congestion to other paths on a stable basis to mitigate the attack. Overall, data traffic flow may be automatically smoothed out while mitigating the attack, and may impact the attacking user without impacting other users of the SDN system 302.

The embodiments as described above detect and identify specific attack links in order to mitigate a convergence attack using existing SDN infrastructure, and do not limit bandwidth or data traffic flow on the attack links. For example, on-flow throttling may limit the bandwidth of a user to no more than double every second, which may be sufficient to allow rerouting in the SDN system 302 while also having insignificant performance impacts. By enforcing the on-flow throttling for the attacking user, statistical provisioning may still be practical to achieve high utilization levels of the SDN system 302. Indeed, if the attack is accidental and/or just a feature of a strange emergent flow phenomenon the user subject to the throttling may not even notice.

Figure 4:
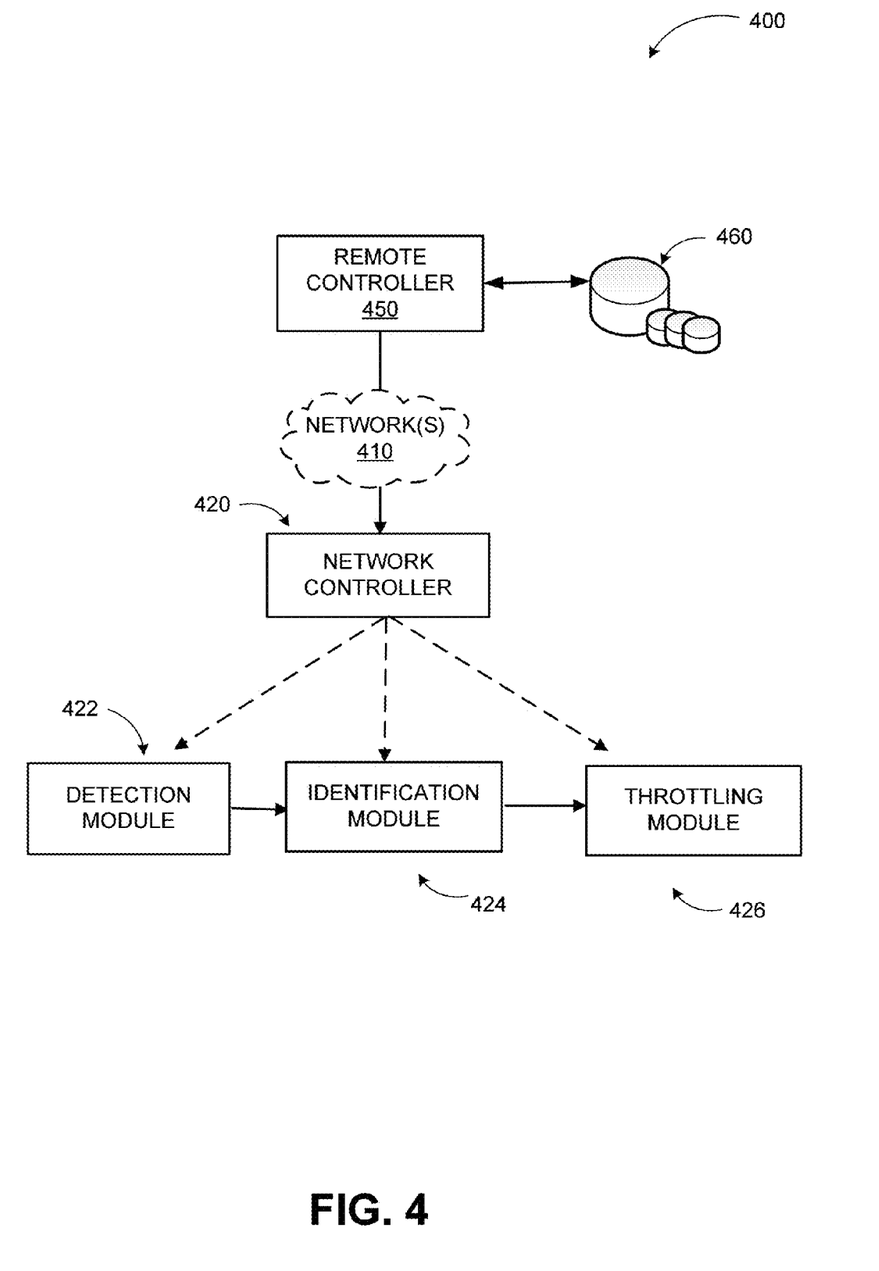
FIG. 4 illustrates an example network controller to mitigate a convergence attack in a network.

FIG. 4 illustrates an example network controller to mitigate a convergence attack in a network, arranged in accordance with at least some embodiments described herein.

System 400 may include at least one network controller 420, at least one detection module 422, at least one identification module 424, and at least one throttling module 426. In some embodiments, the network controller 420 may further include a communication module. The network controller may be a network management server, a network security server of network management, or a network security server of a third party network security service, for example. The network controller 420 may be operated by human control or may be configured for automatic operation, or may be directed by a remote controller 450 through at least one network (for example, via network 410). Data associated with controlling the different processes of detection, identification, and throttling may be stored at and/or received from data stores 460.

The network controller 420 may include or control the detection module 422 configured to detect a path-based convergence attack in a portion of a network that includes multiple nodes interconnected by links in a closed configuration, and the communication module configured to communicate with the multiple nodes. The network controller 420 may further include or control the identification module 424 configured to identify one or more potential attack links causing the attack in order to generate a list from the identified potential links. The identification module 424 may be also configured to iterate the list across the potential links to gather traffic statistics of the network portion, and determine one or more attack links based on the traffic statistics. The network controller 420 may further include or control the throttling module 426 configured to enforce data traffic throttling to mitigate the attack.

As discussed previously, the detection module 422 may be configured to detect a path-based convergence attack in a network portion. In some examples, the network portion may be in a SDN system, and the attack may be an OSPF convergence attack. The detection module may be configured to issue a command to the network portion that instructs the multiple nodes, or switches, of the network portion to track TTL values of one or more data packets at each node. The detection module may also be configured to receive the average TTL values or samples of the TTL values of the data packets from the multiple nodes of the network portion according to a pre-defined schedule or received upon a request from the attack detection module. The attack may be detected in response to a determination that the average TTL values of the data packets are substantially decreased over the multiple nodes.

The identification module 424 may be configured to identify one or more potential attack links causing the attack in order to generate a list from the identified potential attack links. The potential attack links causing the attack may be identified based on the detected attack and a topology of the network portion. For example, graph linkages from the topology may be determined in order to analyze which of the links of the network portion are the potential attack links based on the detected attack. One or more nodes at which the average TTL values are substantially decreased may be identified as victim nodes. The list may be generated from the identified potential attack links such that the list includes potential attack links that are in the closed configuration of the network portion interconnecting the identified victim nodes. The list may be further generated such that the list includes potential attack links that have alternating congestion signals. The identification module 424 may be further configured to iterate the list across the potential attack links to gather traffic statistics of the network portion, and determine one or more attack links based on the traffic statistics.

The throttling module 426 may be configured to enforce data traffic throttling to the attack links to mitigate the attack. In one embodiment, the traffic flow may be directed to non-affected links of the network portion to mitigate the attack. In another embodiment, the data traffic throttling may be on-flow rate throttling, where the on-flow rate throttling may limit user-specific traffic flow increases to the attack links to mitigate the attack. For example, the on-flow rate throttling may limit traffic flow increases to the attack links made by an attacking user.

The examples in FIGS. 1-4 have been described using specific networks, configurations, and systems to detect and identify one or more attack links of a path-based convergence attack in order to mitigate the attack are not limited to the specific networks, configurations, and systems according to these examples.

Figure 5:
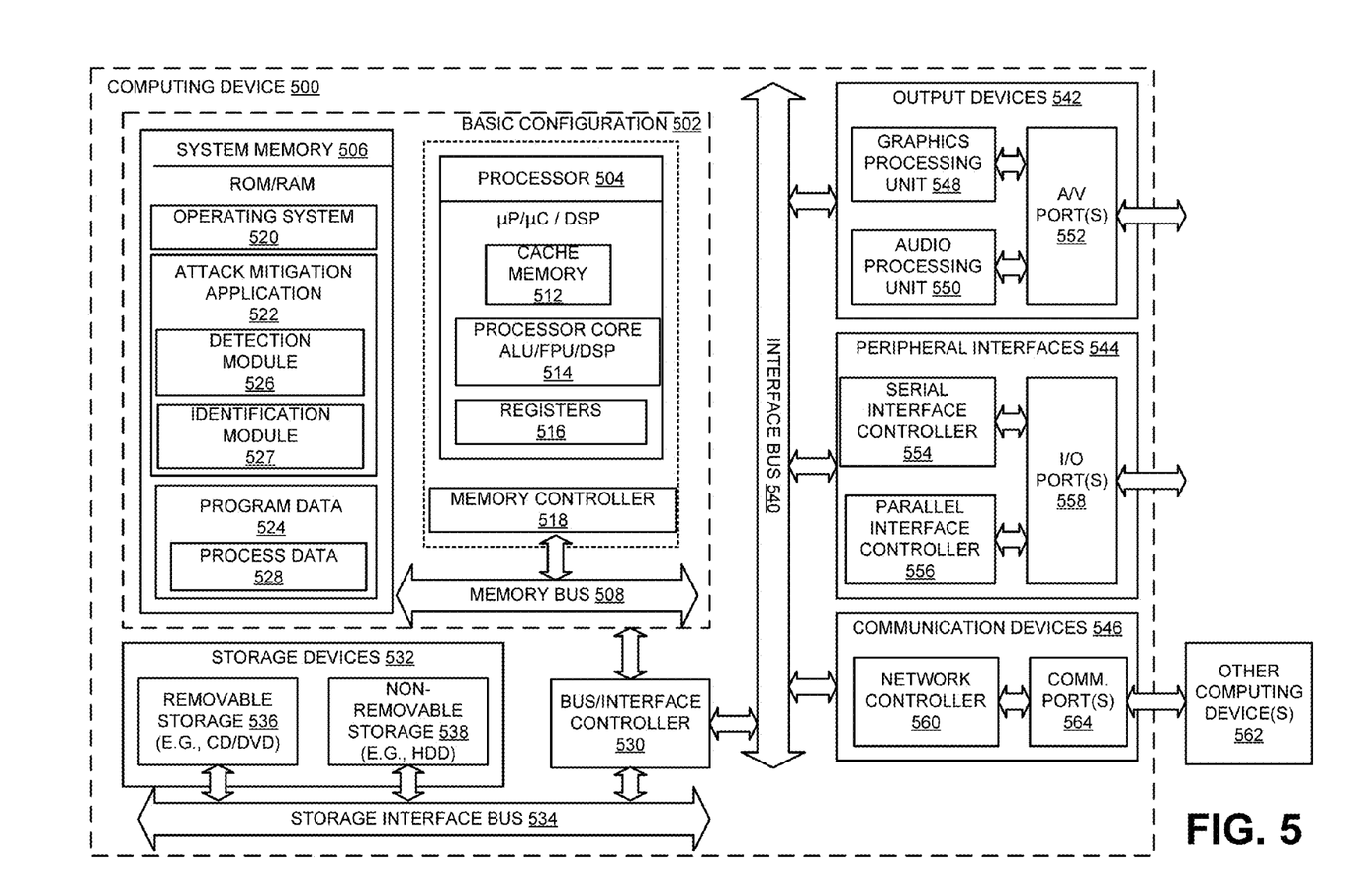
FIG. 5 illustrates a general purpose computing device, which may be used to detect and identify one or more attack links of a convergence attack to mitigate the attack.

FIG. 5 illustrates a general purpose computing device, which may be used to detect and identify one or more attack links of a convergence attack to mitigate the attack, arranged in accordance with at least some embodiments described herein.

For example, a computing device 500 may be used as a server, desktop computer, portable computer, smart phone, special purpose computer, or similar device such as a controller. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor ($\mu$P), a microcontroller ($\mu$C), a digital signal processor (DSP), or any combination thereof. The processor 504 may include one more levels of caching, such as a cache memory 512, one or more processor cores 514, and registers 516. The example processor cores 514 may each include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, an attack mitigation application 522, and program data 524. The attack mitigation application 522 may include a detection module 526 and an identification module 527, which may be an integral part of the application or a separate application on its own. The detection module 526 may be configured to detect a path-based convergence attack in a portion of a network based on average TTL values received from multiple nodes, or switches, of the network portion. The identification module 527 may be configured to identify one or more potential attack links causing the attack. The identification module 527 may be further configured to generate a list from the identified potential attack links that may be iterated across the potential attack links to gather traffic statistics in the network portion, where the traffic statistics may be used to determine the one or more attack links causing the attack. The program data 524 may include, among other data, process data 528, such as average TTL value data related to detection of the convergence attack, and topology and network statistic data related to identification of the attack links, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more storage devices 532 via a storage interface bus 534. The storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536, and the non-removable storage devices 538 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (for example, one or more output devices 542, one or more peripheral interfaces 544, and one or more communication devices 546) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (for example, keyboard, mouse, pen, voice input device, touch input device, etc.) or other peripheral devices (for example, printer, scanner, etc.) via one or more I/O ports 558. An example communication device 546 includes a network controller 560, which may be arranged to facilitate communications with one or more other computing devices 562 over a network communication link via one or more communication ports 564. The one or more other computing devices 562 may include servers, client devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods to mitigate a convergence attack in a network. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 6:
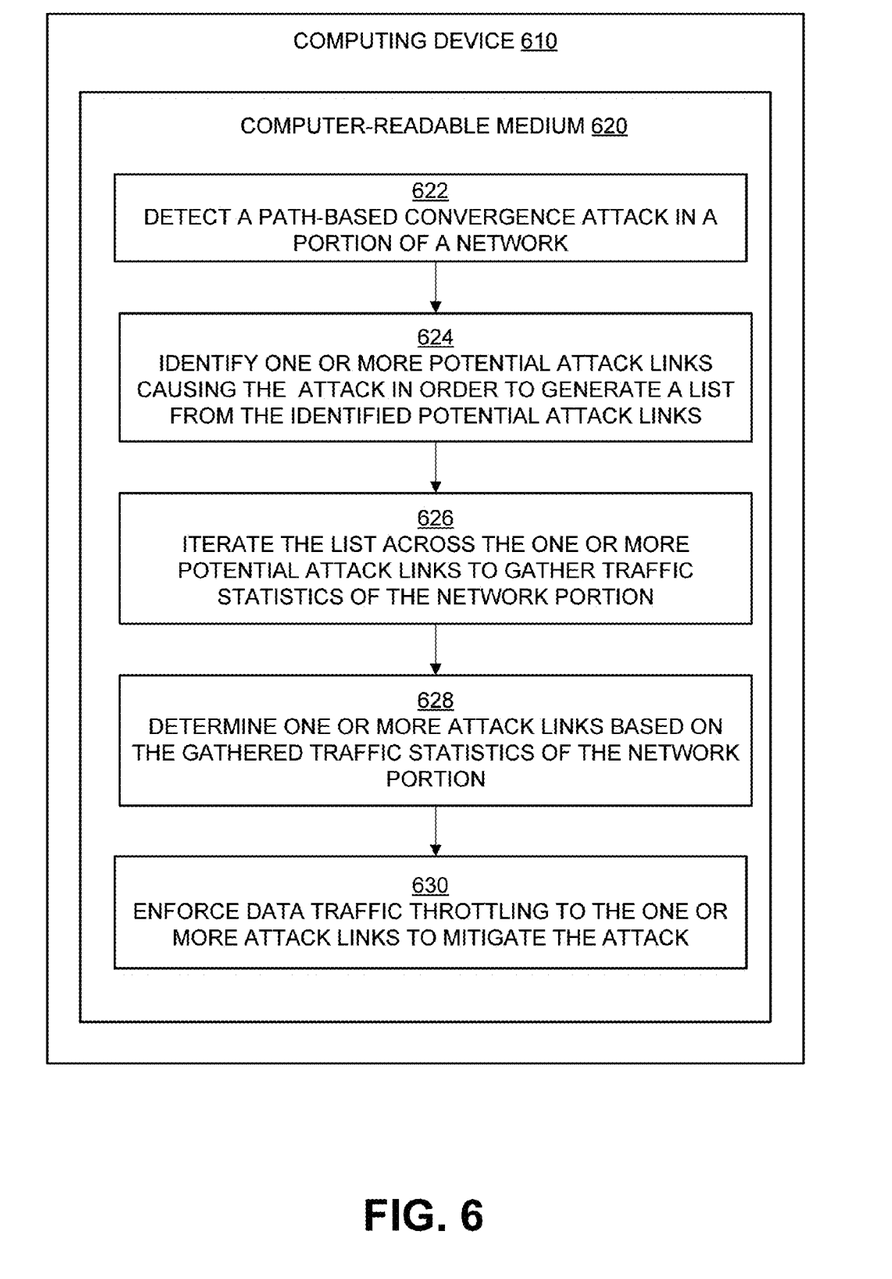
FIG. 6 is a flow diagram illustrating an example process to mitigate a path-based convergence attack that may be performed by a computing device such as the computing device in FIG. 5.

FIG. 6 is a flow diagram illustrating an example method to mitigate a path-based convergence attack that may be performed by a computing device, such as the computing device in FIG. 5, arranged in accordance with at least some embodiments described herein.

Example methods may include one or more operations, functions or actions as illustrated by one or more of blocks 622, 624, 626, 628, and/or 630. The operations described in the blocks 622 through 630 may also be stored as computer-executable instructions in a computer-readable medium such as a computer-readable medium 620 of a computing device 610.

An example process to mitigate a path-based convergence attack may begin with block 622, "DETECT A PATH-BASED CONVERGENCE ATTACK IN A PORTION OF A NETWORK," where an attack detection module (e.g., the attack detection module 314) of an attack mitigation system (e.g., the attack mitigation system 304) may be configured to detect a path-based convergence attack in a portion of a network (e.g., the network portion 306) that includes multiple nodes (e.g., the nodes 308), or switches, interconnected by links (e.g., the links 310) in a closed configuration with multiple paths. In some examples, the network portion may be in a SDN system (e.g., the SDN system 302), and the path-based convergence attack may be an OSPF attack. The attack detection module may receive average TTL values (e.g., the average TTL values 312) of one or more data packets from the nodes of the network portion through issuance of a command to the network portion that instructs the nodes to track the TTL values of the one or more data packets at each node. The average TTL values may be received according to a predefined schedule or received upon a request from the attack detection module. The attack may be detected in response to a determination that the average TTL values of the one or more data packets are substantially decreased over the multiple nodes.

Block 622 may be followed by block 624, "IDENTIFY ONE OR MORE POTENTIAL ATTACK LINKS CAUSING THE ATTACK IN ORDER TO GENERATE A LIST FROM THE IDENTIFIED POTENTIAL ATTACK LINKS," where an attack identification module (e.g., the attack identification module 316) of the attack mitigation system may be configured to identify one or more potential attack links causing the attack based on the detected attack and a topology (e.g., the topology 318) of the network portion. For example, graph linkages from the topology may be determined in order to analyze which of the links of the network portion are the one or more potential attack links based on the detected attack. One or more nodes at which the average TTL values are substantially decreased may be identified as victim nodes. The attack identification module may be also configured to generate a list (e.g., the list 320) from the identified potential attack links such that the list includes potential attack links that are in the closed configuration of the network portion interconnecting the identified victim nodes. The list may be further generated such that the list includes potential attack links that have alternating congestion signals.

Block 624 may be followed by block 626, "ITERATE THE LIST ACROSS THE ONE OR MORE POTENTIAL ATTACK LINKS TO GATHER TRAFFIC STATISTICS OF THE NETWORK PORTION," where the list generated by the attack identification module may be iterated across the potential attack links within the list to gather traffic statistics (e.g., the traffic statistics 322) of the network portion.

Block 626 may be followed by block 628, "DETERMINE ONE OR MORE ATTACK LINKS BASED ON THE GATHERED TRAFFIC STATISTICS OF THE NETWORK PORTION," where one or more attack links may be determined (e.g., the attack links may be determined 324) based on the gathered traffic statistics by the attack identification module.

Block 628 may be followed by block 630, "ENFORCE DATA TRAFFIC THROTTLING TO THE ONE OR MORE ATTACK LINKS TO MITIGATE THE ATTACK," where a throttling module (e.g., the throttling module 326) of the attack mitigation system may be configured to enforce data traffic throttling to the attack links to mitigate the attack. In one embodiment, the traffic flow may be directed to non-affected links of the network portion to mitigate the attack. In another embodiment, the data traffic throttling may be on-flow rate throttling, where the on-flow rate throttling may limit user-specific (for example, an attacking user) traffic flow increases to the attack links to mitigate the attack.

The blocks included in the above described process are for illustration purposes. Detection and identification of one or more attack links of a path-based convergence attack in order to mitigate the attack may be implemented by similar processes with fewer or additional blocks. In some embodiments, the blocks may be performed in a different order. In some other embodiments, various blocks may be eliminated. In still other embodiments, various blocks may be divided into additional blocks, or combined together into fewer blocks.

Figure 7:
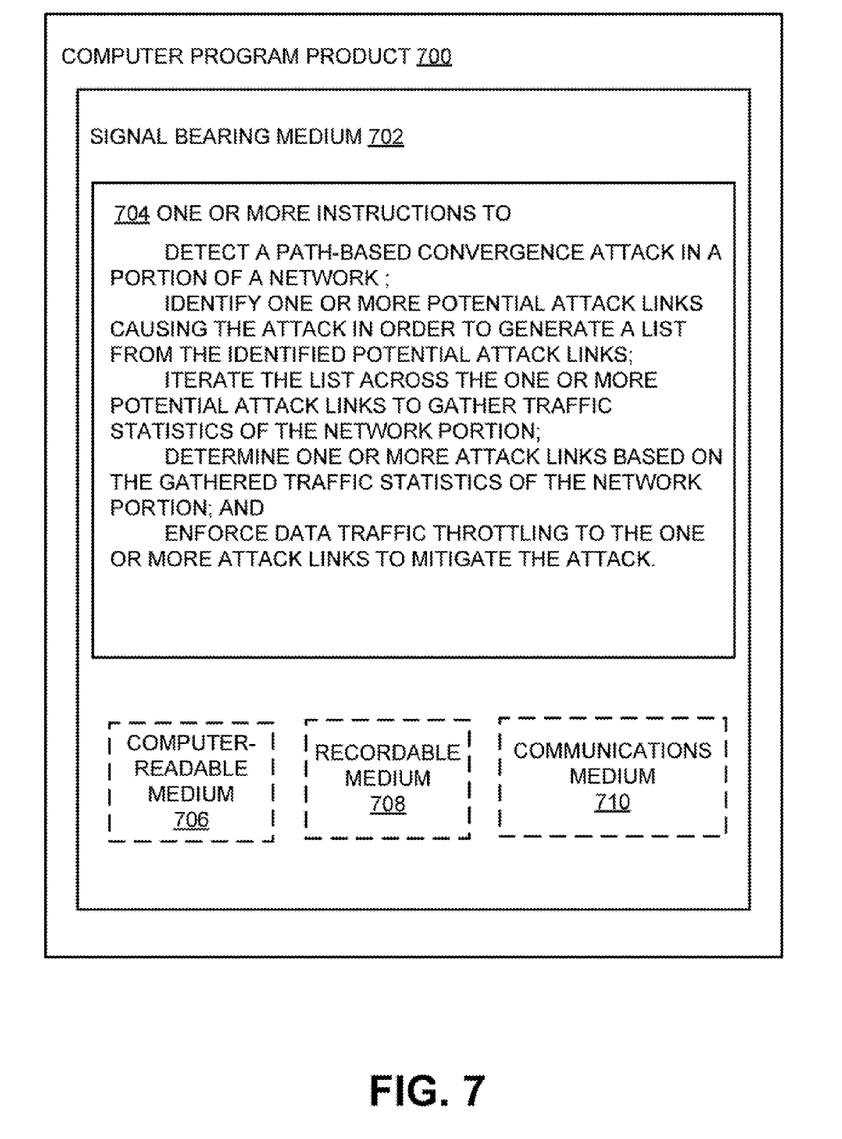
FIG. 7 illustrates a block diagram of an example computer program product, all arranged in accordance with at least some embodiments described herein.

FIG. 7 illustrates a block diagram of an example computer program product, all arranged in accordance with at least some embodiments described herein.

In some embodiments, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, a detection module 526 and an identification module 527 executed on the processor 504 may undertake one or more of the tasks shown in FIG. 7 in response to the instructions 704 conveyed to the processor 504 by the signal bearing medium 702 to perform actions associated with detecting and identifying one or more attack links of a path-based convergence attack in order to mitigate the attack. Some of those instructions may include, for example, one or more instructions to detect a path-based convergence attack in a portion of a network, identify one or more potential attack links causing the attack in order to generate a list from the identified potential attack links, iterate the list across the one or more potential attack links to gather traffic statistics of the network portion, determine one or more attack links based on the gathered traffic statistics of the network portion, and enforce data traffic throttling to the one or more attack links to mitigate the attack, according to some embodiments described herein.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (for example, a fiber optic cable, a waveguide, a wired communications link, a wireless communication link, etc.). Thus, for example, the computer program product 700 may be conveyed to one or more modules of the processor 504 of FIG. 5 by an RF signal bearing medium, where the signal bearing medium 702 is conveyed by the wireless communications medium 710 (for example, a wireless communications medium conforming with the IEEE 802.11 standard).

According to some examples, methods to mitigate a convergence attack in a network are provided, where the methods are executed at least in part on a computing device. An example method may include detecting a path-based convergence attack in a portion of the network, where the network portion includes multiple nodes interconnected by links in a closed configuration, and identifying one or more potential attack links causing the attack in the network portion to generate a list from the identified potential attack links. The example method may also include iterating the list across the potential attack links to gather traffic statistics of the network portion, determining one or more attack links based on the gathered traffic statistics of the network portion, and enforcing data traffic throttling to the attack links to mitigate the attack.

In other examples, the path-based convergence attack may be an open shortest path first (OSPF) convergence attack. Detecting the attack may include receiving average time to live (TTL) values of one or more data packets from the multiple nodes of the network portion, and detecting the OSPF convergence attack in response to a determination that the average TTL values of the one or more data packets are substantially decreased over the multiple nodes. Receiving the average TTL values of the data packets from the multiple nodes of the network portion may include issuing a command to the network portion, where the command instructs the multiple nodes of the network portion to track the TTL values of the data packets at each node. One or more nodes at which the average TTL values of the one or more data packets are substantially decreased may be identified as victim nodes.

In further examples, identifying the potential attack links may include determining graph linkages from a topology of the network portion in order to analyze which of the links are the potential attack links based on the detected attack. The list may be generated such that the list includes potential attack links that are in the closed configuration interconnecting one or more identified victim nodes. The list may also be generated such that the list includes potential attack links that have alternating congestion signals. Enforcing data traffic throttling to the attack links to mitigate the path-based convergence attack may include employing on-flow rate throttling to limit user-specific increases in traffic flow provided to the one or more attack links in order to dampen oscillations of the attack. Traffic flow may also be directed to non-affected links of the network portion to mitigate the attack.

According to some embodiments, network controllers to mitigate a convergence attack in a network are described. An example network controller may include a communication module configured to communicate with multiple nodes of the network, wherein the multiple nodes are interconnected by links in a closed configuration within a portion of the network, a memory configured to store instructions, and a processor coupled to the memory. The processor may be operable to execute an attack mitigation application in conjunction with the instructions stored in the memory. The attack mitigation application may be configured to detect a path-based convergence attack in the network portion, identify one or more potential attack links causing the attack in the network portion to generate a list from the identified potential attack links, and iterate the list across the potential attack links to gather traffic statistics of the network portion. The attack mitigation application may be also configured to determine one or more attack links based on the gathered traffic statistics of the network portion, and enforce data traffic throttling to the attack links to mitigate the attack.

In other embodiments, the attack mitigation application may be further configured to receive average time to live (TTL) values of one or more data packets from the multiple nodes of the network portion. The attack mitigation application may be further configured to detect the path-based convergence attack in response to a determination that the average TTL values of the data packets are substantially decreasing over the multiple nodes. One or more nodes at which the average TTL values of the one or more data packets are substantially decreased may be identified as victim nodes. The TTL values may be an upper bound on a duration of time that the one or more data packets exist in a network. The generated list may include potential attack links that are in the closed configuration interconnecting one or more identified victim nodes. The generated list may also include potential attack links that have alternating congestion signals.

In further embodiments, the enforced data traffic throttling is an on-flow rate throttling, where the on-flow rate throttling may limit an increase in traffic flow provided to the one or more attack links in order to dampen oscillations of the path-based convergence attack. The on-flow rate throttling may be user-specific. The network portion may be a portion of a software defined network (SDN). The network controller may be a network management server, a network security server of network management, or a network security server of a third party network security service.

According to some examples, systems to mitigate a convergence attack in a network are described. An example system may include a detection module, an identification module, a throttling module, and a network controller. The detection module may be configured to detect a path-based convergence attack in a portion of the network by receiving average time to live (TTL) values of one or more data packets from multiple nodes of the network portion, wherein the multiple nodes are interconnected by links in a closed configuration within the network portion, and detecting the attack in response to a determination that the average TTL values of the data packets are substantially decreased over the multiple nodes. The identification module may be configured to identify one or more potential attack links causing the attack in the network portion to generate a list from the identified potential attack links, iterate the list across the potential attack links to gather traffic statistics of the network portion, and determine one or more attack links based on the gathered traffic statistics of the network portion. The throttling module may be configured to enforce data traffic throttling to the one or more attack links to mitigate the attack, where the data traffic throttling may be on-flow rate throttling configured to limit user-specific increases in traffic flow provided to the one or more attack links. The network controller may be coupled to and configured to coordinate operations of the detection module, the identification module, and the throttling module.

In other examples, the detection module may be further configured to issue a command to the network portion that instructs the multiple nodes of the network portion to track the TTL values of the data packets at each node. The average TTL values may be received according to a pre-defined schedule or received upon a request from the detection module. One or more nodes at which the average TTL values of the data packets are substantially decreased may be identified as victim nodes. The generated list may include potential attack links that are in a closed configuration interconnecting one or more identified victim nodes, and that have alternating congestion signals. The system may be a part of a datacenter management system.

There are various vehicles by which processes and/or systems and/or other technologies described herein may be effected (for example, hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various compositions, methods, systems, and devices are described in terms of "comprising" various components or steps (interpreted as meaning "including, but not limited to"), the compositions, methods, systems, and devices can also "consist essentially of" or "consist of the various components and steps, and such terminology should be interpreted as defining essentially closed-member groups."

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, may be equivalently implemented in integrated circuits, as one or more computer programs running on one or more computers (for example, as one or more programs running on one or more computer systems), as one or more programs running on one or more processors (for example as one or more programs running on one or more microprocessors), as firmware, or as virtually any combination thereof, and that designing the circuitry and/or writing the code for the software and/or firmware would be possible in light of this disclosure.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, will be possible from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (for example, a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that particular functionality is achieved. Hence, any two components herein combined to achieve a particular functionality may be seen as "associated with" each other such that the particular functionality is achieved, irrespective of architectures or intermediate components. Likewise, any two components so associated may also be viewed as being "operably connected", or "operably coupled", to each other to achieve the particular functionality, and any two components capable of being so associated may also be viewed as being "operably couplable", to each other to achieve the particular functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method executed at least in part on a computing device to mitigate a convergence attack in a network, the method comprising:
    receiving average time to live (TTL) values of one or more data packets from multiple nodes in a portion of the network, wherein the multiple nodes are interconnected by links in a closed configuration;
    detecting a path-based convergence attack in response to a determination that the average TTL values of the one or more data packets are substantially decreased over the multiple nodes;
    identifying one or more potential attack links causing the attack in the network portion to generate a list from the identified potential attack links,
    iterating the list across the one or more potential attack links to gather traffic statistics of the network portion;
    determining one or more attack links based on the gathered traffic statistics of the network portion; and
    enforcing data traffic throttling by employing on-flow rate throttling to limit user-specific increases in traffic flow provided to the one or more attack links to mitigate the attack.

2. The method of claim 1, wherein the path-based convergence attack is an open shortest path first (OSPF) convergence attack.

3. The method of claim 1, wherein receiving the average TTL values of the one or more data packets from the multiple nodes of the network portion comprises:
issuing a command to the network portion, wherein the command instructs the multiple nodes of the network portion to track the TTL values of the one or more data packets at each node.

4. The method of claim 1, further comprising:
identifying one or more nodes at which the average TTL values of the one or more data packets are substantially decreased as victim nodes.

5. The method of claim 1, wherein identifying the one or more potential attack links comprises:
determining graph linkages from a topology of the network portion in order to analyze which of the links are the one or more potential attack links based on the detected attack.

6. The method of claim 1, further comprising:
generating, the list such that the list includes potential attack links that are in the closed configuration interconnecting one or more identified victim nodes.

7. The method of claim 1, further comprising:
generating the list such that the list includes potential attack links that have alternating congestion signals.

8. The method of claim 1, further comprising:
directing traffic flow to non-affected links of the network portion to mitigate the attack.

9. A network controller to mitigate a convergence attack in a network, the network controller comprising:
a communication module configured to communicate with multiple nodes of the network, wherein the multiple nodes are interconnected by links in a closed configuration within a portion of the network;
a memory configured to store instructions; and
a processor coupled to the memory, the processor operable to execute an attack mitigation application in conjunction with the instructions stored in the memory, the attack mitigation application configured to:
receive average time to live (TTL) values of one or more data packets from the multiple nodes of the network portion;
detect a path-based convergence attack in response to a determination that the average TTL values of the one or more data packets are substantially decreasing over the multiple nodes;
identify one or more potential attack links causing the attack in the network portion to generate a list from the identified potential attack links;
iterate the list across the one or more potential attack links to gather traffic statistics of the network portion;
determine one or more attack links based on the gathered traffic statistics of the network portion; and
enforce data traffic throttling to the one or more attack links to mitigate the path-based convergence attack, wherein the enforced data traffic throttling is an on-flow rate throttling configured to limit user-specific increases in traffic flow provided to the one or more attack links.

10. The network controller of claim 9, wherein the TTL values are an upper bound on a duration of time that the one or more data packets exist in a network.

11. The network controller of claim 9, wherein the network portion is a portion of a software defined network (SDN).

12. The network controller of claim 9, wherein the network controller is one of a network management server, a network security server of network management, or a network security server of a third party network security service.

13. A system to mitigate a convergence attack in a network, the system comprising:
a detection module configured to detect a path-based convergence attack in a portion of the network by:
receiving average time to live (TTL) values of one or more data packets from multiple nodes of the network portion, wherein the multiple nodes are interconnected by links in a closed configuration within the network portion; and
detecting the attack in response to a determination that the average TTL values of the one or more data packets are substantially decreased over the multiple nodes;
an identification module configured to:
identify one or more potential attack links causing the attack in the network portion to generate a list from the identified potential attack links;
iterate the list across the one or more potential attack links to gather traffic statistics of the network portion; and
determine one or more attack links based on the gathered traffic statistics of the network portion;
a throttling module configured to enforce data traffic throttling to the one or more attack links to mitigate the attack, wherein the data traffic throttling is on-flow rate throttling configured to limit user-specific increases in traffic flow provided to the one or more attack links; and
a network controller coupled to and configured to coordinate operations of the detection module, the identification module, and the throttling module.

14. The system of claim 13, wherein the average TTL values are one of: received according to a pre-defined schedule and received upon a request from the detection module.

15. The system of claim 13, wherein the system is a part of a datacenter management system.

* * * * *